United States Patent [19]
Avera

[11] Patent Number: 4,728,526
[45] Date of Patent: Mar. 1, 1988

[54] GRAVITATIONALLY-STABILIZED PEANUT-CONTAINING COMPOSITION

[75] Inventor: Fitzhugh L. Avera, Alameda, Calif.

[73] Assignee: Jack W. Kuehn, Sr., Burnsville, Minn.

[21] Appl. No.: 943,681

[22] Filed: Dec. 18, 1986

[51] Int. Cl.$^4$ .............................................. A23L 1/38
[52] U.S. Cl. ...................................... 426/633; 426/658
[58] Field of Search ............... 426/548, 804, 633, 632, 426/658

[56] References Cited

U.S. PATENT DOCUMENTS

| | | | |
|---|---|---|---|
| 1,398,352 | 11/1921 | Willison . | |
| 1,859,206 | 5/1932 | Heisler . | |
| 2,876,107 | 3/1959 | Jucaitis | 426/804 |
| 2,955,040 | 10/1960 | Avera | 99/128 |
| 3,140,953 | 7/1964 | Roberts | 426/633 |
| 3,245,803 | 4/1966 | Baker et al. | 99/128 |
| 3,278,314 | 10/1966 | Colby et al. | 99/128 |
| 3,580,729 | 5/1971 | Darragh et al. | 99/128 |
| 3,619,207 | 11/1971 | Dzurik et al. | 99/128 |
| 3,766,165 | 10/1973 | Rennhard | 260/209 |
| 3,876,794 | 4/1975 | Rennhard | 426/152 |
| 3,903,311 | 9/1975 | Billerbeck et al. | 426/324 |
| 3,971,857 | 7/1976 | Fruda et al. | 426/658 |
| 3,978,246 | 8/1976 | Chozianin et al. | 426/633 |
| 4,042,714 | 8/1977 | Torres | 426/658 |
| 4,062,986 | 12/1977 | Billerbeck et al. | 426/633 |
| 4,152,466 | 5/1979 | Deretchin | 426/633 |
| 4,401,682 | 8/1983 | Battista | 426/658 |
| 4,477,482 | 10/1984 | Avera | 426/632 |
| 4,631,195 | 12/1986 | Colliopoulos et al. | 426/658 |

FOREIGN PATENT DOCUMENTS 671189 9/1963 Canada .................................. 99/176
0152455 9/1983 Japan .

OTHER PUBLICATIONS

Pfizer, 1983, Technical Information, Polydextrose.
Pfizer, Technical Information Sheet 2090, Technical Information, (Mar. 1986).
Pfizer, Chemical Division Sales Brochure, (©1985, Pfizer).
Pfizer Technical Data Sheets, (1981–1982).
Reprint from Food Engineering, (Jul. 1986).
Reprint from Food Processing, (Aug. 1986).
*Food Chemicals Codex*, 2nd Ed., National Academy of Sciences, Washington, D.C., 1972, p. 185.
*Plant Science*, 2nd Ed., W. H. Freeman and Co., San Francisco, Calif., 1974, p. 439.

*Primary Examiner*—Raymond N. Jones
*Assistant Examiner*—Carolyn Paden
*Attorney, Agent, or Firm*—Merchant & Gould

[57] ABSTRACT

A gravitationally-stabilized ground peanut-containing composition utilizing an aqueous polydextrose solution stabilizer is disclosed. A hydrophilic embodiment of the composition compatible with aqueous food systems comprises about 40–50% of unextracted ground peanuts, about 30–50% of a water-soluble, edible nondigestible polydextrose, and about 7.5–20% of water, which solubilizes the polydextrose. A lipophilic embodiment of the composition comprises about 90–96% of unextracted ground peanuts, about 2.0–8.0% of polydextrose, and about 0.5–5.0% of water, which solubilizes the polydextrose.

20 Claims, No Drawings

GRAVITATIONALLY-STABILIZED PEANUT-CONTAINING COMPOSITION

FIELD OF THE INVENTION

The present invention relates to peanut containing compositions such as peanut butter and peanut flavoring compositions, which are gravitationally-stabilized to prevent or inhibit oil separation from the hydrophilic solid phase of the compositions.

BACKGROUND OF THE INVENTION

The manufacture of flavoring compositions for food products has been an important industry for many years. Natural flavors derived from vegetables, fruits, spices, and other sources have been items of commerce which are combined with other foods to provide a wide variety of tastes and textures for the consumer.

One highly desirable flavor is the flavor of fresh roasted peanuts. The peanut, or groundnut as it is called outside the United States, is the seed or fruit of the peanut plant. It comprises a mixture of peanut oils and peanut solids. The oils are primarily hydrophobic fatty materials which, in combination with the substantially proteinaceous peanut solids, can provide pleasing peanut flavor and texture in food systems. Because of their hydrophobic nature, however, the peanut oils tends to separate from the predominantly hydrophilic peanut solids when ground peanuts are mixed in many food systems. Therefore, hydrophobic peanut oil and hydrophilic peanut solids pose a significant problem which needs to be addressed in the formulation of peanut-containing compositions, especially when peanut butter or other peanut-derived compositions having hydrophobic peanut oil components are added to water-based foods.

Because aqueous systems generally mix poorly with the hydrophobic peanut lipids, an unstable system is generally created when aqueous systems are mixed with peanut-containing compositions. As these unstable mixtures destabilize, the hydrophobic peanut lipids and the hydrophilic peanut solids tend to separate. The tendency towards separation is called "gravitational instability." Conversely, peanut compositions whose hydrophobic and hydrophilic components resist separation are considered "gravitationally-stable" compositions. They are gravitationally stable because gravity is not able to cause the denser (heavier) hydrophilic, substantially proteinacious, solid material to separate from the less dense lipophilic lipid phase. The separation of the hydrophilic and hydrophobic peanut components, whether it occurs in aqueous systems or otherwise, can result in deleterious changes in the odor and flavor of the product. Undesireable changes in texture present another problem, as does the appearance of such a product, which may lessen the product's appeal to the consumer. These problems can result from both the direct physical separation of components, as well as from resulting microbiological and oxidative deterioration.

One attempt to solve the problem of combining peanuts in food systems involves separating the peanut oil from the proteinaceous peanut solids and combining the separate solid peanut component in the food system. The separation of peanut oil from peanut solids, however, can substantially reduce the peanut flavor.

Other attempts to solve this problem have led those skilled in the art to gravitationally stabilize the components of these products through the use of fats and oils. The fats and oils which are typically used are solid or semi-solid at room temperature, or have been hydrogenated or partially hydrogenated to make them so. Those skilled in the art of utilizing peanut flavor in food development, however, have shown concern for the undesirable effect these oleaginous stabilizers have on peanut flavor. While these stabilizers may lessen the development of undesireable oxidative off odors and off flavors, as well as the unacceptable textural changes due to the separation of the lipid phase, the peanut flavor can be masked by the presence of these stabilizers. Additionally, products stabilized with these oleaginous stabilizers tend to destablize at temperatures above 30° C. when the solid and semi-solid stabilizers liquify.

Efforts to stabilize hydrophilic peanut flavorings using non-oleaginous stabilizers have also been made. Avera (U.S. Pat. No. 4,477,482) produced a gravitationally-stabilized hydrophilic peanut flavoring composition for incorporation in water-based food systems. The Avera composition is stabilized with edible polyhydroxy alcohol compounds such as sorbitol, mannitol or other cyclic or straight-chain alcohols. Although these non-oleaginous stabilizers do not appear to mask the peanut flavor as strongly as the oleaginous stabilizers do, they have flavor of their own which may detract from or diminish the natural peanut flavor.

Accordingly, a substantial need exists for a gravitationally-stabilized hydrophilic peanut-containing composition that is compatible with aqueous food systems. Peanut flavorings are needed which resist the development of off odors, off flavors, and undesireable textural attributes, while providing a true peanut flavor. A need also exists for a gravitationally-stabilized, lipophilic, peanut-containing food product which resists the deleterious effects of phase separation cited above while effectively preserving its peanut flavor.

BRIEF DESCRIPTION OF THE INVENTION

The present invention provides a gravitationally-stabilized, hydrophilic, peanut-containing flavoring composition that is compatible with aqueous food systems. This composition comprises a homogenous mixture of about 40–50% by weight of unextracted, ground peanuts including their peanut oil, about 30–50% by weight of polydextrose, and about 7.5–20% by weight of water, wherein said polydextrose is dissolved in said water. The composition may also comprise about 0.1–10% by weight of adjuvants such as sugar, sugar substitutes, salt, salt substitutes, preservatives or coloring agents, or mixtures thereof.

A second aspect of the present invention provides a gravitationally-stabilized, lipophilic, peanut-containing composition, comprising a mixture of about 90.0–96.0% by weight of unextracted ground peanuts including their peanut oil, about 2.0–8.0% by weight of polydextrose, and about 0.5–5.0% by weight of water, wherein the polydextrose is dissolved in said water. In preferred embodiments, the ground peanuts comprise ground, roasted, blanched peanuts. The present peanut-containing compositions provide superior peanut-flavored food products or flavoring agents.

The polydextroses employed in the present compositions are water-soluble, synthetic, edible, undigestible, dextrose polymers which are disclosed by Rennhard in U.S. Pat. Nos. 3,876,794 and 3,766,165 to be useful as dietetic bulking agents. These polymers are produced by the melt polymerization of dextrose (D-glucose) and edible dicarboxylic acid cross-linkers. This product has been disclosed to be useful as a noncaloric bulking agent for incorporation into dietetic food compositions.

In the compositions of the present invention, however, the dissolved polydextrose acts to gravitationally stabilize the peanut-containing compositions so that the lipophilic and hydrophilic components of the compositions will not separate during storage or use. The usefulness of aqueous solutions of polydextrose as a gravitational-stabilizing agents for hydrophilic-hydrophobic food systems, such as the peanut-containing compositions of the present invention, has not been heretofore disclosed. The capacity of polydextrose to stabilize the present compositions depends upon properties of the polydextrose when solubilized in water. It is not believed that solid polydextrose will be effective to stabilize lipophilic and hydrophilic peanut components of the present compositions.

In addition, polydextrose is essentially flavorless, and so, imparts no flavor of its own to the peanut products of the present invention. Therefore, it does not diminish the intensity or unduly alter the natural peanut flavor of these products.

Thus, the present invention provides both a peanut-containing food product which is predominantly lipophilic, and a hydrophilic peanut-containing flavoring which is compatible with aqueous food systems. These compositions may be formulated entirely without other flavor sources, or with minor amounts of well-known flavor synergists such as salt, or sweetners. A preferred embodiment of the present invention can be used to provide a hydrophilic peanut-flavoring composition having an acidic character. Such a product is particularly useful for incorporation into acidic food environments.

It is believed that the lipophilic composition of the present invention comprises liquid-solids system which is a protected dispersion. The problem of achieving gravitational stability in a peanut-containing food system having hydrophilic as well as lipophilic phases is created by the fact that these phases usually seek to present a dineric interface wherein the hydrophilic and lipophilic phases repel one another and attempt to separate, resulting in gravitational instability and, ultimately, phase separation. In the present system, it is believed that the fundamental cause of gravitational stabilization of the peanut oil is due to a bonded solids matrix of the hydrophilic proteinaecious solids connected by the polymeric polydextrose strands which are solubilized in water. This matrix, in turn, entraps the lipophilic peanut oils in an aqueous dispersion. Since the dispersion exists within an aqueous phase, the composition has superior "wetability". The term "wetability" means that they are compatible with aqueous components with which they are easily and readily mixed.

This behavior is in contrast to the oil phase dispersions or suspensions which it is believed are present in peanut compositions stabilized with oleaginous stabilizers. In such products, the solid or semi-solid fatty stabilizers are believed to link the liquid peanut oils into a homogeneous network or phase that suspends the non-lipid hydrophilic solids, thereby inhibiting separation. In this process, the peanut flavor is apparently masked by the solid and semi-solid oleaginous stabilizers. This difference in phase structure, wherein the peanut-containing compositions of the present invention comprise a protected dispersion in an aqueous phase rather than in a lipid phase, is believed to be at least partly responsible for the superior fullness of flavor exhibited by the lipophilic peanut compositions of the present invention.

The present invention further provides peanut-containing compositions prepared by a process comprising combining an aqueous solution comprising 60–80% polydextrose solids with ground peanuts including their peanut oil, and then mixing the polydextrose solution and the peanuts to yield a homogeneous composition. The invention is directed to hydrophilic and lipophilic compositions prepared by this process. The hydrophilic composition prepared by this process comprises about 40–50% peanuts, about 30–50% polydextrose solids, and about 7.5–20% water, wherein the polydextrose solids are dissolved in the water. The lipophilic peanut-containing composition comprises about 90–96% peanuts, about 2.0–8.0% polydextrose, and about 0.5–5.0% water wherein the polydextrose solids are dissolved in the water.

The terms "hydrophobic" and "hydrophilic" are widely-used terms describing the respective natures of materials which resist dispersion in water, and materials which mix readily with water. A hydrophobic material generally exhibits an affinity for lipophilic systems. As used herein, "lipophilic" and "hydrophobic" are interchangeable terms. All percentages (%) in this specification regarding aspects of the present invention, denote % by weight. In the case of polydextrose, weight percentages of solid polydextrose are given. The term "aqueous polydextrose" refers to polydextrose which has been solubilized in water. In addition, the term "aqueous system" is intended to refer to a liquid system having water as its primary solvent. When used in regard to ground peanuts, the term "unextracted" means that the inherent oil in the peanuts has not been extracted, but is present in the ground peanuts. As used herein, "undigestible" is intended to refer to a substance which is non-toxic, but is undigestible by humans and so is not nutritive thereto.

DETAILED DESCRIPTION OF THE INVENTION

The peanut-containing compositions of the present invention comprise ground peanuts, and an effective, gravitationally-stabilizing amount of an aqueous solution of an edible, undigestible polydextrose.

Peanuts, peanut fragments, and ground, roasted and-/or blanched peanuts are articles of commerce and are commonly available commodity products. A preferred peanut ingredient is ground roasted peanuts, and a most preferred peanut ingredient is ground roasted blanched peanuts for reasons of optimal flavor, texture and appearance. All of these products are used with essentially all of their peanut oil. Peanuts generally comprise about 40–50% peanut oil and 20–35% protein. It is possible to make the equivalent of the ground peanuts used in the present invention by adding oil to extracted peanut meal, but it is thought that this can result in substantial flavor loss and is not, therefore, a preferred ingredient for incorporation in the compositions of the present invention.

Polydextrose is an edible but undigestible, synthetic dextrose polymer which has been used as a noncaloric bulking agent in dietetic food compositions. Polydextroses useful in the present composition are disclosed in U.S. Pat. Nos. 3,766,165 and 3,876,794 which are incorporated herein by reference. These non-nutritive carbohydrate substitutes are prepared by polycondensation or melt polymerization of dextrose in the presence of edible polycarboxylic acid cross-linking agents under conditions of reduced pressure. Optionally, polyol plasticizers such as sorbitol, glycerol, monnitol or the like, may be added to the reaction mixture to produce less rigid polymers of lower viscosity.

In general, useful polydextroses can be considered to be randomly-bonded condensation polymers of D-glucose (dextrose) which incorporate about 0.5–10 mole percent of polycarboxylic acid esters and about 5–20% by weight of a food-acceptable polyol in addition to the dextrose. It will be appreciated that other monosaccharides, such as galactose, mannose or other hexoses; maltose or other disaccharides; or mixtures thereof, may be substituted for dextrose in preparing this polycondensation product, so long as they do not change the nature of the product as a whole. The sugars supplied to the reaction mixture are supplied as dry anhydrides or dry hydrated solids in powder form. A wide variety of edible polycarboxylic acids may be used to cross-link the saccharide molecules, including citric acid, fumaric acid, tartaric acid, succinic acid, adipic acid, itaconic acid, malic acid and the like, or mixtures thereof. Among the food-acceptable polyol plasticizers which may be incorporated are sorbitol, glycerol, erythritol, xylitol, mannitol, galactitol and the like, or mixtures thereof.

The melt polymerization process disclosed to be used to make the polydextroses used in the present invention involves combining the dry powdered glucose with the edible polycarboxylic acid cross-linking agent, and, optionally, the food-acceptable polyol plasticizing agent, and heating the mixture under reduced pressure, preferably below about 300 mm Hg, until the mixture melts. The molten mass in maintained at a constant temperature and pressure in the absence of water until substantial polymerization has taken place. During this process, the polycarboxylic acids cross-link the glucose moieties to produce a variety of randomly-bonded polyglucose polymers, wherein the 1–6 linkage predominates. The polyglucose molecules can be formed in a wide variety of molecular weight ranges, but typically exhibit a number average molecular weight of about 1500–18,000.

When the copolymerized with the dextrose and the polycarboxylic acid, the polyol plasticizers partially replace the dextrose moieties, and are integrally incorporated into the polymeric chains.

Three preferred forms of polydextrose, any of which may be used in the present invention, either alone or in combination, are available from Pfizer Chemical Division, New York, NY. These products are Polydextrose (S6810), Polydextrose Type N (70% solution) (S6811), and Polydextrose K. All three of these products are polycondensation products of dextrose, sorbitol and citric acid. Polydextrose S6810 is a water-soluble, dry powder which exhibits a pH of 2.5–3.5 in aqueous solution. It does not have any odor or flavor other than its acid character. It is soluble in water up to about an 80% by weight polydextrose solids solution. Polydextrose Type N is produced as a viscous, clear aqueous solution of partially neutralized polydextrose containing about 70% by weight polydextrose solids. It is neutralized with potassium hydroxide and exhibits a pH range of about pH 5.0–6.0. Polydextrose K is a solid dry powder which has been neutralized with potassium bicarbonate. It is soluble in water up to about an 80% by weight polydextrose solids solution, and has a pH in solution of about pH 5.0–6.0. These commercially-available products may contain unpolymerized edible by-products of the condensation reaction process in minor amounts.

The polydextrose must be solubilized in the aqueous phase of the present compositions in order to effectively stabilize them. Preferably, the polydextrose is solubilized in water before it is mixed with the ground peanuts in formulating the present compositions. A pre-formed aqueous solution of polydextrose can be used, such as Polydextrose Type N from Pfizer. When solid polydextrose is solubilized in water prior to incorporation in the present compositions, the aqueous solution can comprise about 40–80% preferably about 50–80%, and most preferably about 60–80% polydextrose.

Sugar or carbohydrate sweeteners that can be used in making the novel peanut-containing composition of the present invention include commonly available mono- and disaccharide sweeteners, including fructose, glucose, surcrose, honey, invert sugar, and the like, or mixtures thereof. Artificial sweeteners such as L-aspartyl-L-phenylalanine methyl ester or aspartame (available as Nutrasweet(TM) from the G. D. Searle Co., Chicago, Ill.), and saccharin, available as an alkali metal salt such as sodium saccharin, may also be added to the compositions of the present invention. A preferred sugar sweetener comprises a mixture of invert sugar and sucrose for reasons of blendability and cost.

An effective amount of other adjuvants may also be added, such as salt (NaCl) or salt substitutes such as potassium chloride and the like, antimicrobial agents such as benzoate and propionate salts, and the like, coloring agents such as carmel, anatto and the F.D.&C. colorants and the like, or other ingredients to enhance the stabilized peanut-containing compositions with regard to flavor, appearance, stability with respect to bacteria or mold, and the like.

HYDROPHILIC PEANUT-CONTAINING FLAVORING COMPOSITION

The hydrophilic peanut-containing flavoring composition, having compatibility with aqueous food systems, comprises an amount of unextracted ground peanuts including their peanut oil which is effective to provide a peanut flavor, and an amount of dissolved polydextrose effective to gravitationally stabilize the composition. A preferred embodiment of the composition contains ground roasted blanched peanuts. The hydrophilic peanut-containing flavoring composition comprises about 30–60%, preferably about 35–55%, and most preferably about 40–50% ground peanuts. Less than about 40% peanuts will begin to produce a flavoring composition with a flavor which is insufficient to satisfy most consumers. At greater than about 50% of peanuts, the flavoring composition will begin to lose its compatibility with aqueous foods.

The composition further comprises about 20–60%, most preferably about 30–50% of polydextrose which preferably is solubilized in water prior to incorporation in the present composition. The composition further comprises about 5–20%, preferably about 7.5–20% of water which acts to dissolve the polydextrose. Any of the three preferred forms of polydextrose, or mixtures therof, may be incorporated in the present composition in order to yield compositions which are either acidic or neutral with respect to pH. Preferably, the acidic composition has a pH of about 4.5–6.9. The neutral pH composition preferably has a pH of about 6.5–7.5. The composition may optionally comprise about 0.1–10.0% of adjuvants such as sugar or sugar substitutes, salt or salt substitutes, coloring agents, edible antimicrobial agents or other desirable food additives or flavor potentiators known in the art. A preferred embodiment of the composition contains about 0.1-2.0% salt (NaCl) and/or salt substitutes, e.g., about 0.5-1.5% salt or salt substitutes.

The individual components of the novel peanut flavoring can be combined in any order to form the peanut-flavoring composition of the present invention. The components are typically combined in a process which comprises first solubilizing the polydextrose component in the water, or using a pre-formed aqueous solution of polydextrose, and then mixing any adjuvants in the aqueous polydextrose solution until a homogeneous mixture results. Finally, this mixture, including the aqueous polydextrose solution, is added to the ground peanuts and mixed until the mixture is homogeneous.

The hydrophilic peanut-flavoring composition of this invention can be used in essentially any food composition, dry mix, or protein concentrate in which peanut flavoring is desirable. Such food systems include peanut-flavored candies; peanut-flavored chips; peanut-flavored syrups; soft drinks; instant drinks; breakfast combinations (hot or cold); gelatins; puddings; yogurts; pastries such as bread, pies, cakes, brownies, doughnuts, turnovers, sandwiches, breads, rolls, dry mixes, etc.; frozen confections such as popsicles, snow cones, sherbets, frozen yogurts, soft serve; jams, jellies; soups; ice creams such as peanut-flavored ice cream, chocolate peanut-flavored ice cream, banana peanut-flavored ice cream, etc.; candies such as peanut-flavored cream chocolates, peanut-flavored coconut bars, etc.; liquors and cordials; and the like. The hydrophilic composition when freshly made is a flowable, highly pumpable composition which is easy to handle. This composition can also be used in non-food areas such as in producing pleasant scent, in masking the unpleasant flavor of medicine or in hiding the odor or flavor of pest control agents. The flavoring compositions described in Example II below, may be used in acidic pickled products such as relish, pickles and other acidic or acidulated food products.

LIPOPHILIC PEANUT-CONTAINING COMPOSITION

The lipophilic peanut-containing composition comprises about 90-96% ground peanuts, about 1.0-8.0% polydextrose, and about 0.2-9.0% water. Preferably, the lipophilic composition comprises about 2.0-8.0%, most preferably about 2.5-8.0% polydextrose, as well as, about 0.5-8.0%, more preferably about 0.5-5.0%, and most preferably about 0.75-3.0% water, wherein the polydextrose is preferably dissolved in the water prior to incorporation in the present composition. The lipophilic composition may comprise about 0.1-5.0% of other edible adjuvants used in the hydrophilic peanut-containing composition described hereinabove, such as sugar and/or sugar substitutes, salt or salt substitutes, edible antimicrobial agents, food coloring agents, and other desireable food additives or flavor potentiators known in the art. In the most preferred embodiments, the ground peanuts are unextracted ground, roasted, blanched peanuts including their peanut oil.

The lipophilic peanut-containing composition of the present invention may qualify for classification as a peanut butter under the Federal Standards of Identity for Peanut Butter (21 CFR§164.150). It can be a smooth or crunchy-style peanut butter. Both of these products are considered to be homogeneous within the context of the present invention, since the components are evenly distributed throughout. The claims, as they regard the percentage of ground peanuts and polydextrose for the lipophilic composition, are designed to be encompassed by the Federal Standards of Identity for Peanut Butter.

The invention will be further described by reference to the following detailed examples.

EXAMPLE I

HYDROPHILIC COMPOSITION

Into a one quart stainless steel mixing bowl was placed 41.58 parts by weight of roasted, blanched and ground peanuts, at a temperature of 74° C. To this was added 0.42 parts by weight of salt. The mixture was then subjected to low shear mixing action until it was relatively homogenous. Then 58 parts by weight of aqueous Type N Polydextrose (Pfizer Chemical Division, N.Y., N.Y.) (70% polydextrose solids) was added at room temperature. Mixing was continued at low to moderate shear mixing action. This was continued until a smooth product of pleasant peanut flavor was produced. The product was hydrophilic in nature and was gravitationally-stable indefinitely at room temperature.

EXAMPLE II

HYDROPHILIC COMPOSITION WITH ACIDIC CHARACTER

Into a one quart stainless steel high shear mixing blender was placed 30 parts by weight of water at 74° C. To this, 70 parts by weight of solid polydextrose powder (Solid Polydextrose (S6810), Pfizer Chemical Division, N.Y., N.Y.) was gradually added under high shear mixing conditions. Blending and solubilization produced a viscous but pourable smooth liquid. The mixture was allowed to stand until the air bubbles escaped. In another one quart stainless steel mixing bowl was placed 42 parts by weight of roasted, blanched and ground peanuts. To this was added 58 parts by weight of the 70% polydextrose preparation prepared in the first step above. This mixture was blended with low to moderate shear mixing action until smooth and homogenous. The product had the same physical appearance and separation resistance present in the product described in Example I above. It was hydrophilic in nature and, in contrast to the product of Example I, had an acidic rather than a relatively neutral character. At room temperature, the product was gravitationally stable indefinitely. The only flavor detectable in this product was that of peanuts.

EXAMPLE III

LIPOPHILIC COMPOSITION

The following ingredients were mixed with low to medium shear mixing action in a one quart stainless steel mixing bowl at 73° C. until a homogeneous mixture resulted: 91 parts by weight of unextracted, roasted, blanched and ground peanuts; and 1 part by weight salt. To that mixture 8 parts by weight of a concentrated aqueous solution of Type N Polydextrose (Pfizer Chemical Division, N.Y., N.Y.) (70% polydextrose solids) at room temperature was added. The mixing action was continued until a smooth homogeneous mixture resulted. A smooth pumpable product resulted which was gravitationally stable indefinitely under ambient storage conditions.

The invention has been described with reference to various specific and preferred embodiments and techniques. However, it should be understood that many variations and modifications may be made while remaining within the spirit and scope of the invention.

What is claimed is:

1. A gravitationally-stabilized hydrophilic peanut-containing composition that is compatible with aqueous food systems which comprises a homogeneous dispersion of:
   (a) about 40-50% by weight of unextracted ground peanuts including their peanut oil;
   (b) about 30-50% by weight of a water-soluble edible polydextrose; and
   (c) about 7.5-20% by weight of added water; wherein said polydextrose is dissolved in said water; and wherein said polydextrose includes polycarboxylic acid cross-linking agents.

2. The composition of claim 1, wherein the unextracted ground peanuts comprise ground roasted blanched peanuts.

3. The composition of claim 1, which comprises about 35-45% by weight of the polydextrose.

4. The composition of claim 1 which is formed by a process comprising combining a solution of the polydextrose in the water with the ground peanuts.

5. The composition of claim 1, wherein said composition further comprises about 0.1 to 10% by weight of adjuvants, including sugar, sugar substitutes, salt, salt substitutes, preservatives, coloring agents, or mixtures thereof.

6. The composition of claim 5, wherein the composition comprises about 0.1-2.0% by weight of salt.

7. The composition of claim 1, wherein said composition is acidic.

8. The composition of claim 7, which has a pH of about 4.5-6.9.

9. The composition of claim 1, which exhibits a neutral pH.

10. The composition of claim 9, wherein the composition has a pH of about 6.5 to 7.5.

11. The composition of claim 1, wherein the polydextrose is a water-soluble, cross-linked, polydextrose, wherein the polydextrose has a number average molecular weight between about 1500 to 18,000.

12. A gravitationally-stabilized lipophilic peanut-containing composition comprising a homogeneous dispersion of:
   (a) about 90.0-96.0% by weight of unextracted ground peanuts including their peanut oil;
   (b) about 2.0-8.0% by weight of polydextrose; and
   (c) about 0.5-5.0% by weight of added water; wherein said polydextrose is dissolved in said water; and wherein said polydextrose includes polycarboxylic acid cross-linking agents.

13. The composition of claim 12, wherein the polydextrose has a molecular weight of about 1500 to 18,000.

14. The composition of claim 12, wherein said composition further comprises about 0.1-5% of adjuvants, including sugar, sugar substitutes, salt, salt substitutes, coloring agents, or mixtures thereof.

15. The composition of claim 14, wherein the composition comprises about 0.1-2.0% by weight of salt.

16. The composition of claim 12, wherein the unextracted ground peanuts comprise ground roasted blanched peanuts.

17. A hydrophilic peanut-containing composition prepared by a process comprising:
   (a) combining an aqueous solution comprising 60-80% by weight of polydextrose solids with ground peanuts including their peanut oil, and
   (b) mixing said aqueous polydextrose solution and said peanuts to yield a pumpable homogeneous, hydrophilic dispersion comprising about 40-50% by weight of ground peanuts including peanut oil, about 30-50% by weight by polydextrose solids, and about 7.5-20% by weight of added water, wherein the polydextrose solids are dissolved in the water; and wherein said polydextrose includes polycarboxylic acid cross-linking agents.

18. The composition of claim 17, wherein about 0.1-10% by weight of adjuvants, including sugar, sugar substitutes, salt, salt substitutes, preservatives, coloring agents, or mixtures thereof, are combined with the aqueous polydextrose solution and the ground peanuts in step (a), and wherein said homogeneous hydrophilic composition further comprises about 0.1-10% by weight of adjuvants such as sugar, sugar substitutes, salt, salt substitutes, preservatives, coloring agents or mixtures thereof.

19. A lipophilic peanut-containing composition prepared by a process comprising:
   (a) combining an aqueous solution comprising 60-80% by weight of polydextrose solids with ground peanuts including their peanut oil; and
   (b) mixing said aqueous polydextrose solution and said peanuts to yield a pumpable homogeneous lipophilic dispersion comprising about 90-96% by weight of ground peanuts including their peanut oil, about 2.0-8.0% by weight of polydextrose, and about 0.5-5.0% by weight of added water, herein the polydextrose solids are dissolved in the water; and wherein said polydextrose includes polycarboxylic acid cross-linking agents.

20. The lipophilic peanut-containing composition of claim 19, wherein about 0.1-10% by weight of adjuvants, including, sugar, sugar substitutes, salt, salt substitutes, preservatives, coloring agents, or mixtures thereof, are combined with the aqueous polydextrose solution and the ground peanuts in step (a), and wherein said homogeneous hydrophilic composition further, comprises about 0.1-10% by weight of adjuvants including sugar, sugar substitutes, salt, salt substitutes, preservatives, coloring agents or mixtures thereof.

* * * * *